United States Patent
Nagata

[11] Patent Number: 6,007,753
[45] Date of Patent: Dec. 28, 1999

[54] METHOD FOR PROCESSING AN END PORTION OF A WEATHER STRIP

[75] Inventor: Tatsuhiko Nagata, Kounan, Japan

[73] Assignee: Toyoda Gosei Co., Ltd., Aichi, Japan

[21] Appl. No.: 09/058,410

[22] Filed: Apr. 10, 1998

[30] Foreign Application Priority Data

Apr. 10, 1997 [JP] Japan ..................................... 9-110450

[51] Int. Cl.$^6$ ..................................................... B26D 3/00
[52] U.S. Cl. ..................... 264/138; 264/46.4; 264/46.6; 264/259; 264/296
[58] Field of Search .................................. 264/138, 46.4, 264/46.6, 259, 296

[56] References Cited

U.S. PATENT DOCUMENTS

| | | | |
|---|---|---|---|
| 4,740,336 | 4/1988 | Connen et al. | ........................... 264/296 |
| 4,998,946 | 3/1991 | Nozaki . | |
| 5,374,386 | 12/1994 | Nagata . | |
| 5,711,907 | 1/1998 | Nozaki et al. | ........................... 264/138 |

FOREIGN PATENT DOCUMENTS 5-642   1/1993   Japan .
5-138684   6/1993   Japan .

*Primary Examiner*—Jan H. Silbaugh
*Assistant Examiner*—Dae Young Lee
*Attorney, Agent, or Firm*—Pillsbury Madison & Sutro Intellectual Property Group

[57] ABSTRACT

In the end portion of a weather strip, the projecting base end portion of a hollow seal portion is left as a first uncut-off portion, whereas the main portion of the hollow seal portion is cut off. The thus treated end portion is set in a split mold. In this setting, a cooling mold is brought into contact with a decorative high molecular layer. Also, the first uncut-off portion is pushed down in a direction away from the decorative high molecular layer is thereby pressed against the outer surface of the side wall of a trim portion. Also, a first middle mold is disposed opposed to the outer surface of the side wall to thereby form a cavity, while the cavity and decorative high molecular layer are separated from each other through the first uncut-off portion. Molding material is injected into the cavity to thereby form a mold forming portion.

5 Claims, 8 Drawing Sheets

METHOD FOR PROCESSING AN END PORTION OF A WEATHER STRIP

BACKGROUND OF THE INVENTION

1. Field of the Invention

The present invention relates to a method for processing an end portion of a weather strip in such a manner that the projection of a hollow seal portion formed in the end portion of the weather strip in the longitudinal direction thereof can be eliminated, while the weather strip includes a trim portion and the above-mentioned hollow seal portion that projects from an outer surface of the trim portion.

2. Description of the Related Art

As shown in FIG. 10A, a conventional opening trim weather strip 51 comprises a trim portion 52 to be mounted on a flange (not shown) provided in a door opening peripheral portion of a car, a hollow seal portion 53 with which a door (not shown) can be contacted, and a lip portion 54 for covering an edge portion of an inner garnish (not shown), while these respective portions are integrally formed as an united extrusion molding. Also, on an outer surface of the trim portion 52, which does not reach the hollow seal portion 53, a decorative high molecular layer 55 formed of a polyvinyl chloride (PVC) film, a thermoplastic elastomer (TPE) film or the like is formed and bonded by thermal fusion just after the above-mentioned extrusion molding. In most cases, a pattern such as an embossing pattern or the like is applied onto the surface of the decorative high molecular layer 55.

At least one end portion of the opening trim weather strip 51 in the longitudinal direction is inserted into a cover member such as a scuff plate, pillar garnish, a seat belt anchor cover or the like and, therefore, it is necessary to carry out a process which can eliminate the projection of the hollow seal portion 53.

As one popular method for removing the projection of the hollow seal portion 53, there is known a method in which, as shown in FIG. 10B, the hollow seal portion 53 is pressed into a flat shape and the thus formed flat pressed hollow seal portion 53 is bonded to the outer surface of the trim portion 52 with adhesives. However, in this processing method, since the two end portions of the flat pressed hollow seal portion 53 are caused to stick out from the trim portion 52, it is necessary to cut and remove the sticking-out portions 53a and, after the sticking-out portions 53a are cut off, there are seen cut marks 53b which in turn worsen the appearance of the end portion of the opening trim weather strip 51.

In view of this, as disclosed in Japanese Patent Publication No. Hei. 5-642, there is provided a method in which, while the hollow seal portion located in the end portion of the weather strip is pressed into a flat shape and is pressure attached to the outer surface of the trim portion, the end portion of the weather strip is set in a split mold, a cavity is formed by a heating mold included in the split mold in such a manner that it is continuous with the end face of the weather strip end portion, and molding material is injected into the cavity to thereby form a mold-forming portion.

Also, such a hollow seal portion corner processing method as disclosed in Japanese Patent Publication No. Hei. 5-138684 can be applied to an operation to process the end portion of the hollow seal portion located in the end portion of the weather strip. In particular, as shown in FIG. 11, while the two end portions of the hollow seal portion 53 located in the weather strip end portion are cut and removed, the thus treated weather strip end portion is then set in a split mold 61. In this setting, a cooling mold 62 included in the split mold 61 is contacted with a decorative high molecular layer 55. Also, a heating mold 63 included in the split mold 61 is disposed opposed to the outer surface of a trim portion 52 which is caused to appear due to the removal of the two end portions of the hollow seal portion 53, while a cavity 64 is formed by the heating mold 63. And, molding material is injected into the cavity 64 to thereby form a mold forming portion 56, while the ordinary hollow seal portion 53 or the like is connected to the mold forming portion 53 in a gently inclined manner.

In the above-mentioned weather strip end portion processing method based on the applied use of the above-mentioned Japanese Patent Publications Nos. Hei 5-642 and 5-138684, there is solved the problem that such cut marks 53b as shown in FIG. 10B can be seen or exposed. However, there has been found another problem to be solved: that is, since the cavity formed by the heating mold of the split mold is very close to the decorative high molecular layer, the heat of the heating mold and forming material can be transmitted to the decorative high molecular layer so easily that the decorative high molecular layer can melt, which eliminates an embossing pattern or the like formed on the decorative high molecular layer to thereby worsen the appearance of the weather strip end portion. Even in the method shown in FIG. 11, in which the cooling mold 62 is contacted with the decorative high molecular layer 55, it is difficult to bring the cooling mold 62 into contact with the end portion of the decorative high molecular layer 55 located near the cavity 64 and, therefore, the present end portion of the decorative high molecular layer 55 is easy to melt.

SUMMARY OF THE INVENTION

Thus, the present invention aims at eliminating the above-mentioned drawbacks found in the conventional weather strip end portion processing methods. Accordingly, it is an object of the invention to provide a weather strip end portion processing method in which, when processing the end portion of the weather strip by mold forming in such a manner that the projection of the hollow seal portion can be removed, the decorative high molecular layer formed on the outer surface of the trim portion can be prevented from melting, thereby being able to prevent the appearance of the weather strip end portion from being damaged.

According to the present invention, there is provided a method for processing an end portion of a weather strip in a longitudinal direction thereof, comprising the steps of:

providing a weather strip having a trim portion, a hollow seal portion projecting out from an outer surface of the trim portion, and a decorative high molecular layer formed on the outer surface of a portion of the trim portion that does not reach the hollow seal portion; cutting off an end portion of the hollow seal portion while leaving a first projecting base end portion of the hollow seal portion as a first uncut-off portion; pressing the first uncut-off portion in a direction away from the decorative high molecular layer so as to contact with the outer surface of the trim portion;

forming a cavity by the outer surface of the trim portion, an end face of the pushed-down, first uncut-off portion existing continuously with the outer surface of the trim portion, and a jig set opposed to the outer surface of the trim portion so that the cavity is separated from the decorative high molecular layer through the pushed-down, first uncut-off portion; and injecting molding material into the cavity while cooling the decorative high molecular layer to thereby form a mold forming portion and remove a projection of the hollow seal portion in the end portion of the weather strip.

Here, although the height of the uncut-off portion is not limited to a specific value, preferably, it may be set in the range of 2 mm to 6 mm. In particular, if the height of the uncut-off portion is less than 2 mm, then the distance between the cavity and decorative high molecular layer is too small; and, if it exceeds 6 mm, then the cavity becomes too small in size.

DETAILED DESCRIPTION OF THE PREFERRED EMBODIMENTS

Figure 8:
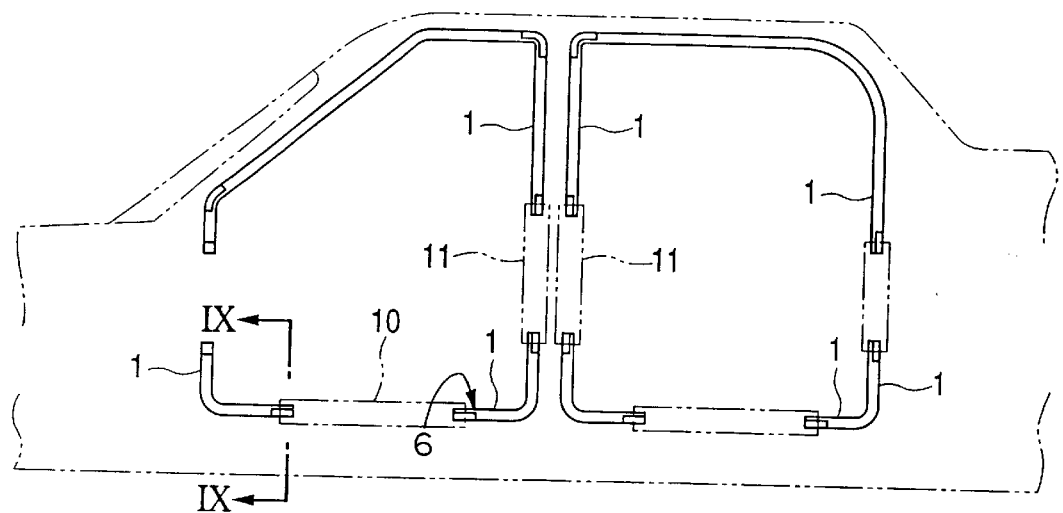
FIG. 8 is a side view of a car, showing the portion of the car to which the present opening trim weather strip is applied.
Figure 9:
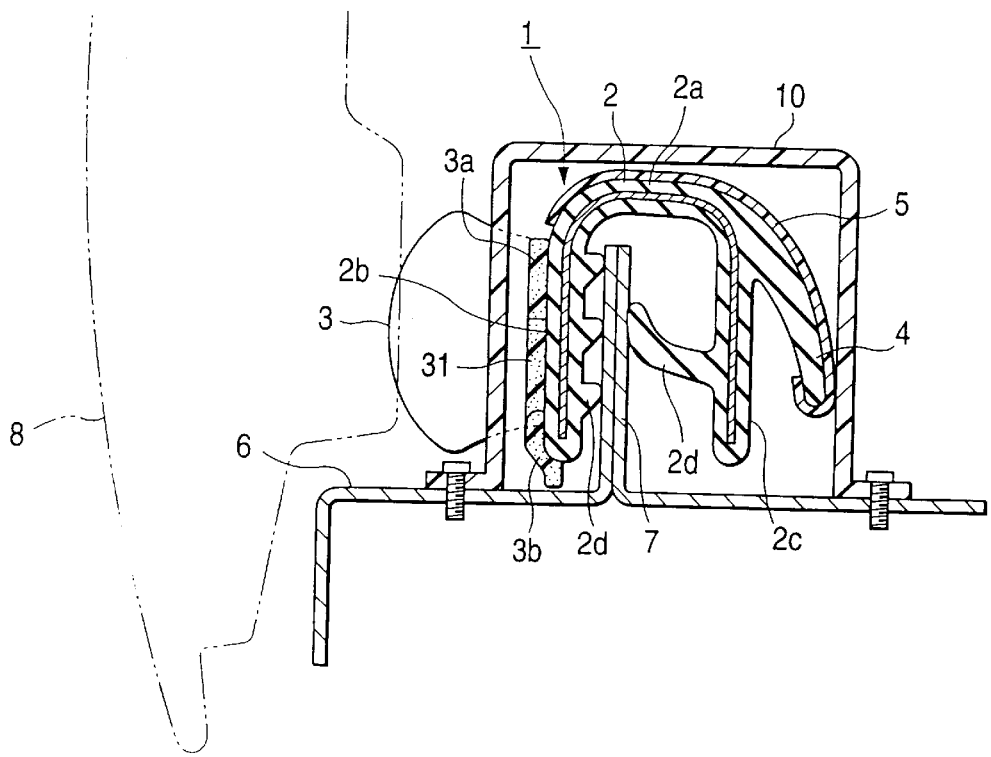
FIG. 9 is a sectional view taken along the IX—IX line shown in FIG. 8.
Figure 10B:
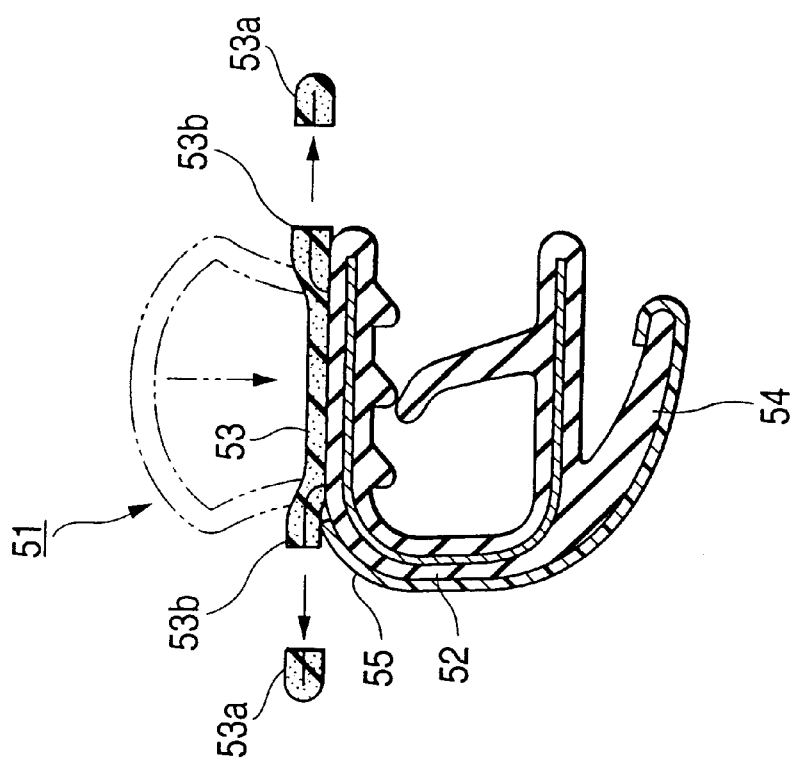
FIGS. 10A and 10B are sectional views of the end portion of a conventional weather strip, showing a method for processing the end portion of the weather strip.
Figure 10A:
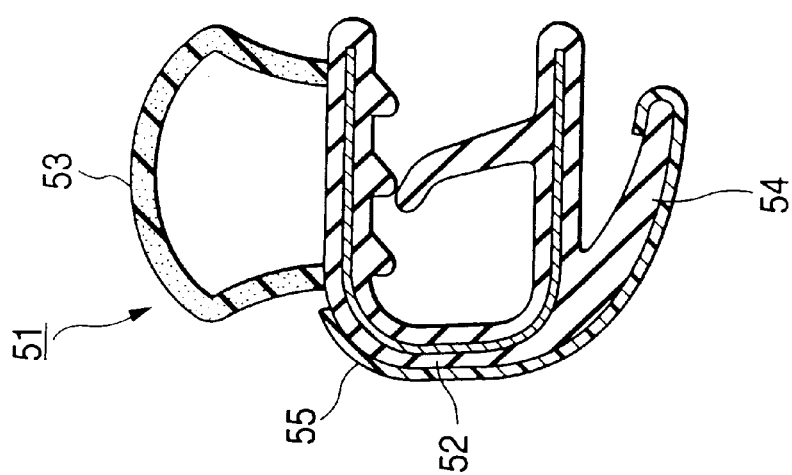
Figure 11:
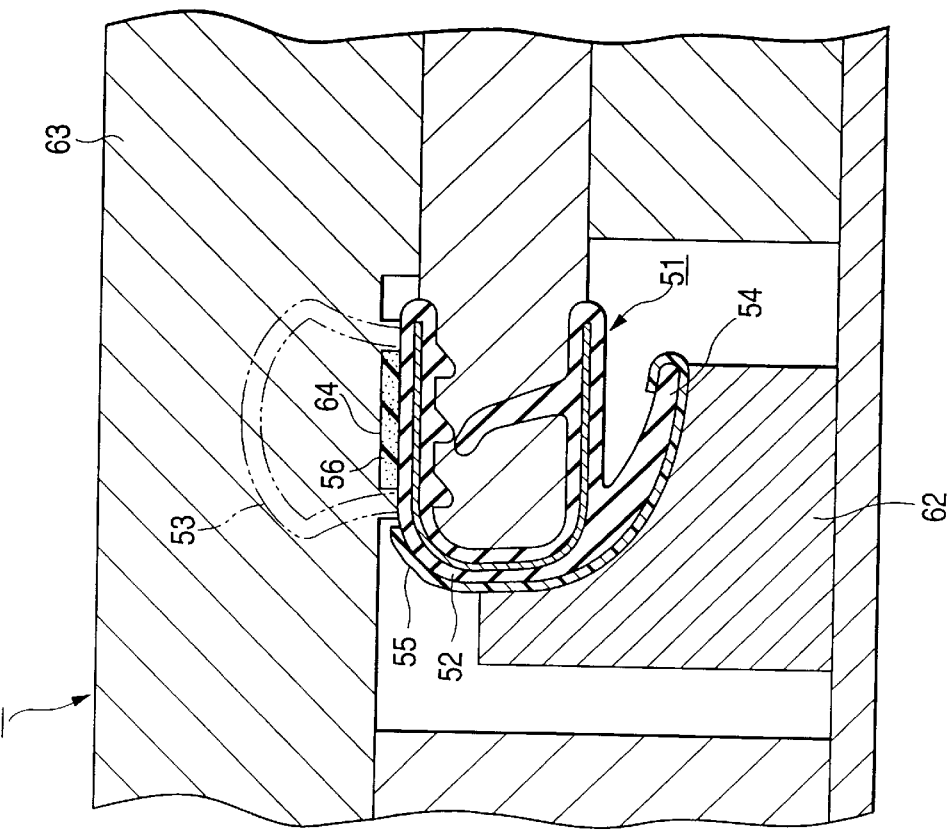
FIG. 11 is a section view of the end portion of another conventional weather strip, showing a method for processing the end portion of the weather strip.

Now, description will be given below of an embodiment of an opening trim weather strip according to the present invention with reference to FIGS. 1 to 9. In particular, an opening trim weather strip 1 according to the present embodiment, as shown in FIGS. 8 and 9, comprises a trim portion 2 to be mounted onto a flange 7 provided in the door opening peripheral portion 6 of a car, a hollow seal portion 3 with which a door 8 provided in the car can be contacted, and a lip portion 4 for covering the end portion of an inner garnish (not shown) provided in the car, while these respective portions are formed integrally in the form of an extrusion molding. On the outer surfaces of the portions of the trim portion 2 and the lip portion 4 that do not reach the hollow seal portion 3, a decorative high molecular layer 5 formed of a TPE film is formed and bonded by thermal fusion just after completion of the above extrusion molding operation. An embossing pattern is applied onto the surface of the decorative high molecular layer 5.

The trim portion 2 can be formed by bending a flat plate portion, which is formed of EPDM (Ethylene/Propylene/Diene copolymer) solid rubber and includes a metal plate insert 12 embedded therein, into a shape having a substantially U-like section; and, the trim portion 2 includes a connecting wall 2a, two side walls 2b and 2c, and a given number of grip lips 2d. Also, the trim portion 2 is mounted such that it can hold a flange 7 not only due to the gripping forces of the grip lips 2d but also due to the shape holding force of the plate insert 12.

The hollow seal portion 3 is a portion which is co-extrusion molded out of EPDM sponge rubber together with the trim portion 2, while the hollow seal portion 3 projects outwardly of the car from one side wall 2b of the trim portion 2.

The lip portion 4 is a portion which is extrusion molded out of EPDM solid rubber together with the trim portion 2, while the design lip portion 4 extends out from the bent portion between the other side wall 2c and connecting wall 2a of the trim portion 2.

Figure 1:
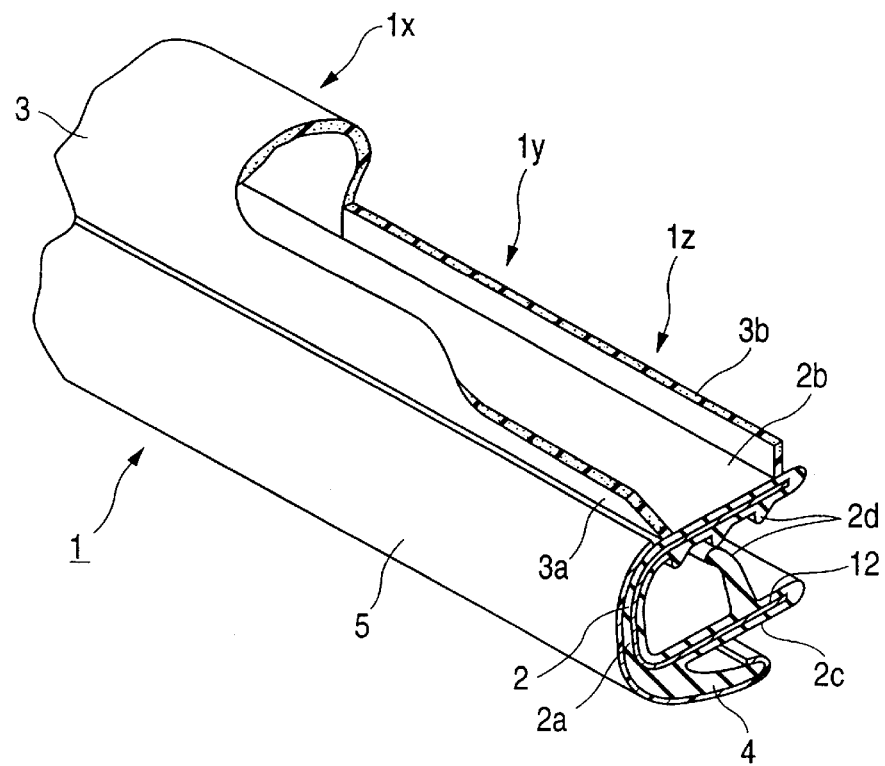
FIG. 1 is a partially perspective view of an opening trim weather strip according to an embodiment of the invention, showing a state thereof when the main portion of a hollow seal portion included in the present opening trim weather strip is cut off in the end portion and connecting portion of the present opening trim weather strip.
Figure 2:
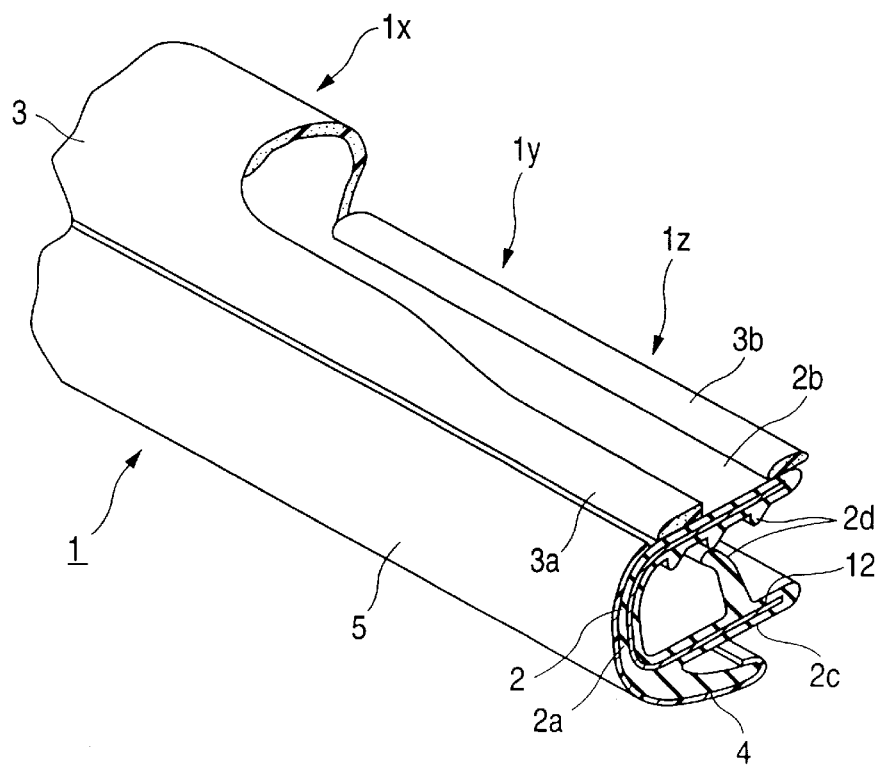
FIG. 2 is a partially perspective view of the present opening trim weather strip, showing a state thereof in which, when two uncut-off portions are left and pushed down within a mold, the end portion and connecting portion of the present opening trim weather strip are taken out from the mold so that they can be observed.
Figure 3:
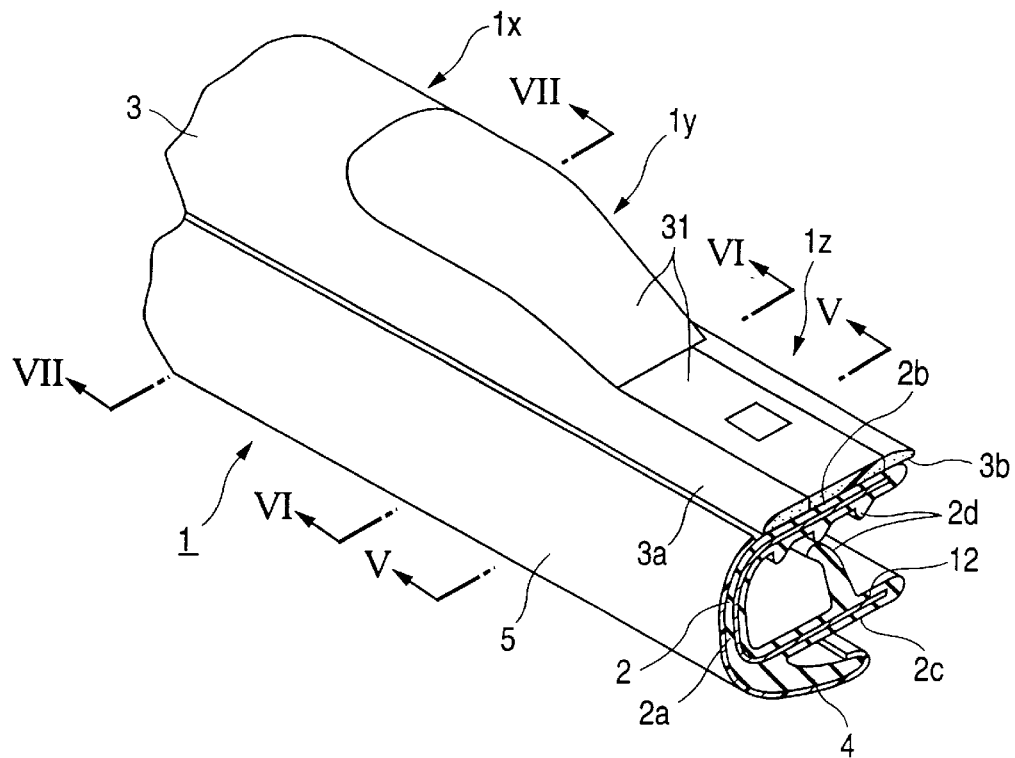
FIG. 3 is a partially perspective view of the present opening trim weather strip, showing the end portion and connecting portion thereof after the end portion is processed.
Figure 4:
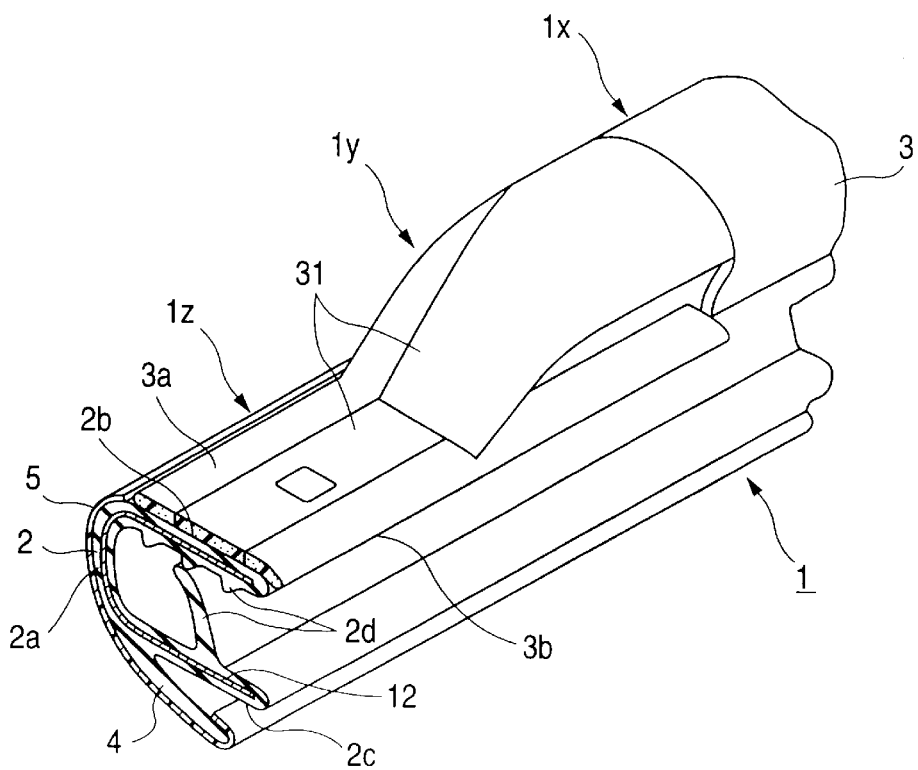
FIG. 4 is a patially perspective view of the present opening trim weather strip, when the end portion and connecting portion thereof are viewed from another angle after the end portion is processed.

Now, FIG. 9 is a sectional view taken along the line IX—IX shown in FIG. 8, in which reference character 10 designates a scuff plate mounted on the lower side of the door opening peripheral portion 6. The end portion 1z (as shown in FIGS. 1 to 4) of the weather strip 1 in the longitudinal direction thereof is inserted into the scuff plate 10 in the present lower side of the door opening peripheral portion 6; and, on the other hand, in the lateral side of the door opening peripheral portion 6, as shown in FIG. 8, in order that the end portion 1z can be inserted into a pillar garnish 11, a seat belt anchor cover, or the like, a processing for removing the projection of the hollow seal portion 3 is carried out in the following steps:

In FIGS. 1, 2, and so on, 1x designates a general portion of the weather strip 1 in which the hollow seal portion 3 exists, 1z stands for the end portion of the weather strip 1 on which the present processing is to be carried out, and 1y expresses a connecting portion which extends from the general portion 1x to the end portion 1z for connecting them together.

As shown in FIG. 1, the two projecting base end portions of the hollow seal portion 3 in the terminal portion 1z are left respectively as first and second uncut-off portions 3a and 3b, whereas the main portion of the hollow seal portion 3 is cut off. The first uncut-off portion 3a is a portion which projects out from the neighborhood of the edge portion of the decorative high molecular layer 5, and the height of the first uncut-off portion 3a is of the order of 4 mm. The second uncut-off portion 3b is a portion which projects out from the neighborhood of the end of the side wall 2b of the trim portion 2, and the height of the second uncut-off portion 3b is of the order of 3 mm.

Also, in the connecting portion 1y as well, the first and second uncut-off portions 3a and 3b of the hollow seal portion 3 are left, whereas the main portion thereof is cut off. However, in the connecting portion 1y, the height of the first uncut-off portion 3a is gradually increased on the way so as to reach the order of the 4 mm to 6 mm.

Figure 5:
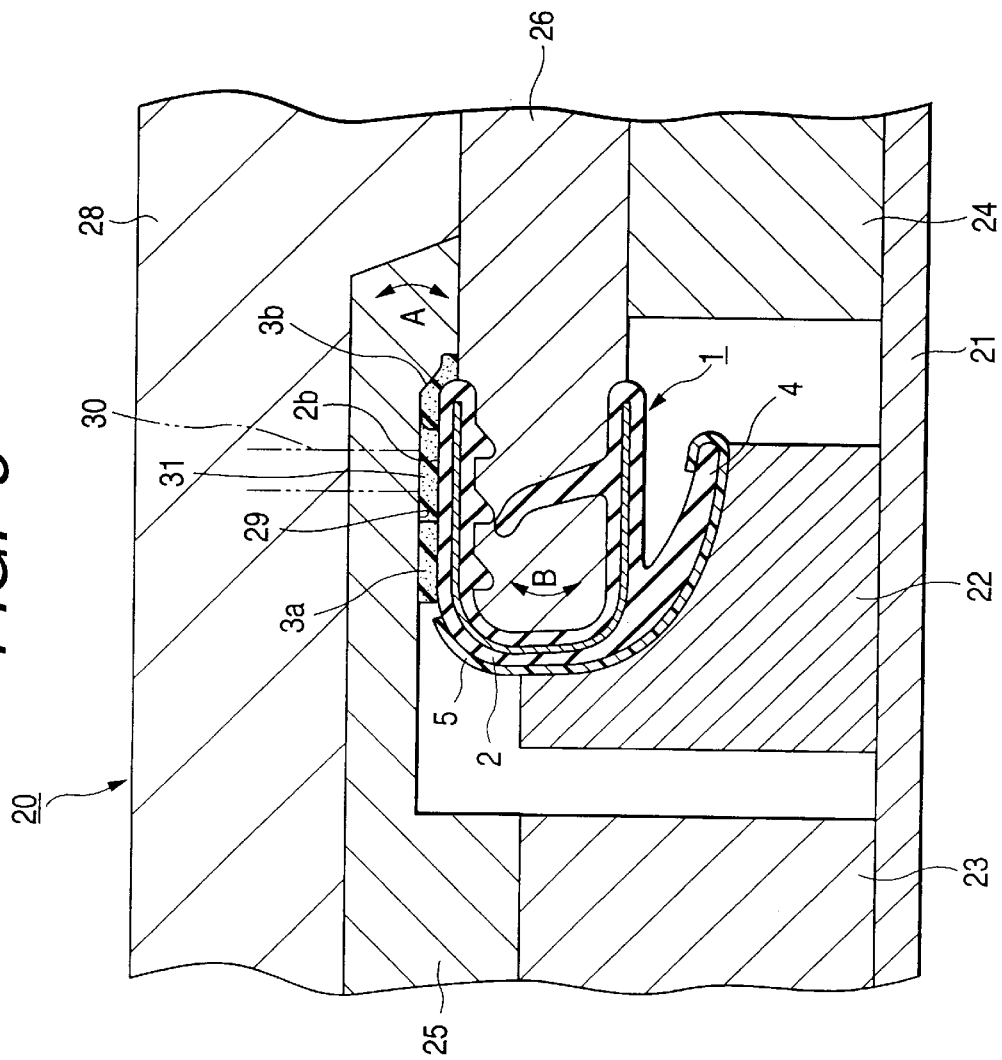
FIG. 5 is a sectional view of the present opening trim weather strip, taken along the V—V line shown in FIG. 3 to show a state thereof when the end portion thereof is being processed within the mold.
Figure 6:
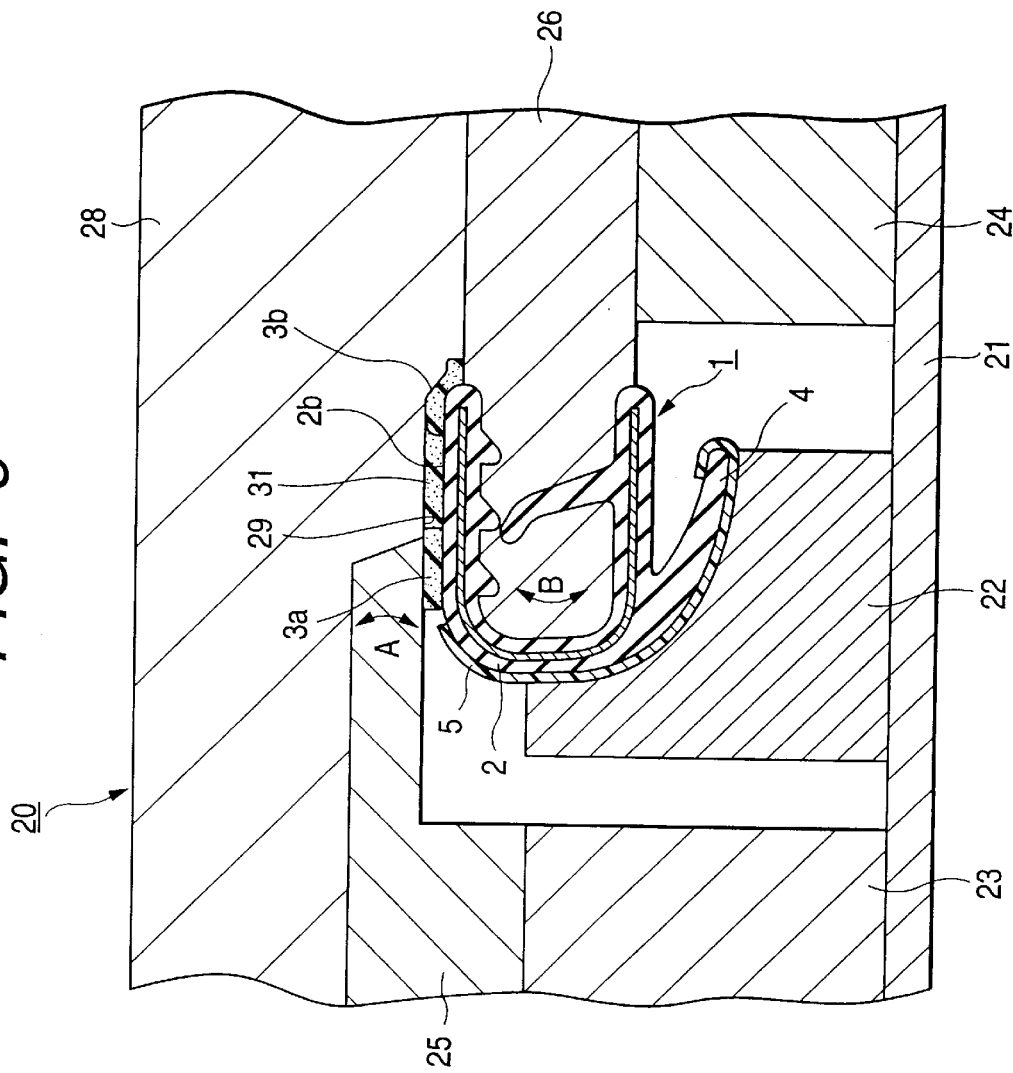
FIG. 6 is a sectional view of the present opening trim weather strip, taken along the VI—VI line shown in FIG. 3 to show a state thereof when the end portion thereof is being processed within the mold.
Figure 7:
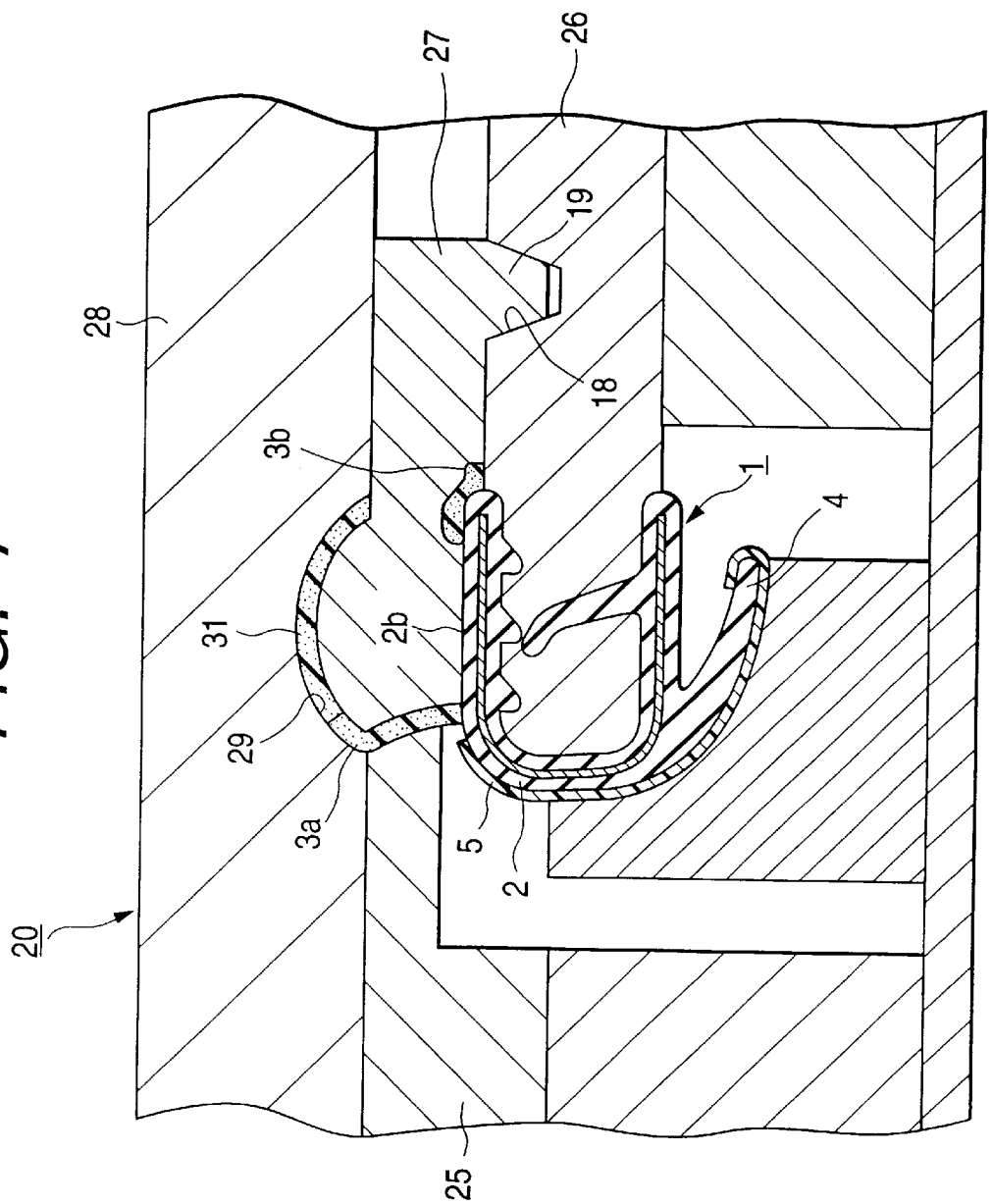
FIG. 7 is a sectional view of the present opening trim weather strip, taken along the VII—VII line shown in FIG. 3 to show a state thereof when the end portion thereof is being processed within the mold.

The end portion 1z and connecting portion 1y are set in a split mold 20 in the following conditions as shown in FIGS. 5, 6 and 7.

Here, the split mold 20 comprises an insulating base member 21; a cooling mold 22, a first lower mold 23, and a second lower mold 24 respectively fixed on the insulating base member 21; a first middle mold 25 carried on the first lower mold 23 through a hinge (not shown) in such a manner that it can be rotated in the direction of an arrow A shown in FIGS. 5 and 6; a second middle mold 26 carried on the second lower mold 24 through a hinge (not shown) in such a manner that it can be rotated in the direction of an arrow B shown in FIGS. 5 and 6; a middle core 27 manually placed on the second middle mold 26 while it is positioned through fitting engagement between a recessed portion 18 and a projecting portion 19; and, an upper mold 28 placed on the first middle mold 25, second middle mold 26 and middle core 27 shown in FIG. 7.

As shown in FIGS. 5 to 7, in the whole area of the end portion 1z and connecting portion 1y, the cooling mold 22 is contacted with almost all of the surface of the decorative high molecular layer 5 except for the upper end portion thereof and, at the same time, the second middle mold 26 is mounted inside the trim portion 2.

Also, in the connecting portion 1y, the middle core 27 having a given shape is mounted in the cut portion of the hollow seal portion 3.

As shown in FIG. 5, in the end portion 1z, the first middle mold 25 is rotated and is thereby butted against the first uncut-off portion 3a, whereby the first uncut-off portion 3a is pushed down in a direction away from the decorative high molecular layer 5 so that it is pressed against the outer surface of the side wall 2b of the trim portion 2.

Also, as shown in FIGS. 5 to 7, in the end portion 1z, a hold pin (not shown) provided on the first middle mold 25 or on the upper mold 28 is butted against the second uncut-off portion 3b and, in the connecting portion 1y, the middle core 27 is butted against the second uncut-off portion 3b, whereby the second uncut-off portion 3b is fallen down on the end portion side of the side wall 2b so that it is pressed against the outer surface of the side wall 2b of the trim portion 2.

By the way, FIG. 2 is a partially perspective view of the hollow seal portion 3, showing the states of the end portion 1z and connecting portion 1y existing within the split mold 20 at the then time while they are taken out to the outside.

As shown in FIGS. 5 and 6, in the end portion 1z, the first middle mold 25 or upper mold 28, which is a heating mold, is disposed opposed to the outer surface of the side wall 2b located continuously with the end face of the first pushed-down, uncut-off portion 3a to thereby form a cavity 29 among the end face of the first uncut-off portion 3a, the outer surface of the side wall 2b, the second uncut-off portion 3b, and the first middle mold 25 or upper mold 28 and, at the same time, the cavity 29 and decorative high molecular layer 5 are separated from each other in terms of both distance and heat through the first pushed-down, uncut-off portion 3a of the hollow seal portion 3.

As shown in FIG. 7, in the connecting portion 1y, the cavity 29 is formed between the middle core 27 and upper mold 28 in such a manner that it is continuous with them.

As shown in FIG. 5, molding material, that is, EPDM rubber with blowing agent contained therein is injected through the upper mold 28 into the cavity 29 from a gate 30 formed in the first middle mold 25 and is then allowed to foam, thereby forming a mold forming portion 31 of EPDM sponge rubber.

The mold forming portion 31 in the end portion 1z is formed in a flat manner in such a manner that it starts with the end face of the first uncut-off portion 3a and reaches the second uncut-off portion 3b.

On the other hand, in the connecting portion 1y, the mold forming portion 31 is formed in such a manner that it connects a flat portion in the end portion 1z with the hollow seal portion 3 in the general portion 1x in a gently inclined way.

According to the above-mentioned weather strip end portion processing method, since the cavity 29 and decorative high molecular layer 5 are separated from each other through the first pushed-down, uncut-off portion 3a, the heat of the first middle mold 25 or upper mold 28, either of which is used as a heating mold, as well as the heat of the molding material are difficult to be transmitted to the decorative high molecular layer 5. This eliminates a fear that the decorative high molecular layer 5 can melt, that is, the embossing pattern provided on the decorative high molecular layer 5 can never be affected by the heat of the first middle mold 25 or upper mold 28 as well as the heat of the molding material, thereby being able to prevent the appearance of the weather strip end portion from being damaged.

Also, according to the present embodiment, in the end portion 1z, not only the first uncut-off portion 3a but also the second uncut-off portion 3b are pushed down, and, therefore, the cut surface of the second uncut-off portion 3b faces on the vehicle side and thus cannot be seen from the outside, which further enhances the appearance of the weather strip end portion.

However, the present invention is not limited to the above-mentioned embodiment but, for example, the invention can be changed and modified properly in the following manner without departing from the scope of the patent claim appended to the specification.

Only the first uncut-off portion 3a is pushed down, but the second uncut-off portion 3b is not pushed down, or the second uncut-off portion 3b is not left uncut-off. In this case, the shape of the first middle mold 25 or upper mold 28 may be changed to such a slight extent that the cavity 29 can be formed.

Further, the invention can be embodied in a weather strip including a seal portion with which other opening and closing member than the door of the car can be contacted.

As has been described heretofore in detail, according to a weather strip end portion processing method in accordance with the invention, there can be provided an excellent effect; that is, when processing the end portion of the weather strip by mold forming in such a manner that the projection of the hollow seal portion can be removed, the decorative high molecular layer formed and coated on the outer surface of the trim portion can be prevented from melting, which in turn can prevent a damaged appearance of the weather strip end portion.

What is claimed is:

1. A method for processing an end portion of a weather strip in a longitudinal direction thereof, comprising the steps of:

providing a weather strip having a trim portion, a hollow seal portion projecting out from an outer surface of said trim portion, and a decorative high molecular layer formed on the outer surface of a portion of said trim portion;

cutting off a portion of an end of said hollow seal portion while leaving a first projecting base thereof as a first uncut-off portion;

setting the end of the weather strip in a mold;

pressing the first uncut-off portion in a direction away from the decorative high molecular layer to push down part of the first uncut-off portion and contact the outer surface of the trim portion with the pushed-down part of the first uncut-off portion;

forming a cavity defined by the outer surface of the end of the trim portion, an end face of the pushed-down part of the first uncut-off portion, and part of the mold member positioned opposite to the outer surface of the end of the trim portion so that said cavity is separated from said decorative high molecular layer by said pushed-down part of the first uncut-off portion; and injecting molding material into said cavity while cooling said decorative high molecular layer to thereby form an injection molded portion on the end of the weather strip.

2. The processing method according to claim 1, wherein said end portion of said weather strip is set in a split mold including a cooling mold in contact with the decorative high molecular layer and a heating mold as the mold member disposed opposite the outer surface of the trim portion so as to form the cavity.

3. The processing method according to claim 1, wherein a second projecting base, located opposite to the first projecting base of the hollow seal portion, is left as a second uncut-off portion in the cutting-off step, the second uncut-off portion being pressed so as to contact the outer surface of the trim portion during the pressing step, and the cavity is formed by the outer surface of the trim portion, an end face of the pushed-down, first uncut-off portion, a portion of the mold member, and the second uncut-off portion.

4. The processing method according to claim 1, wherein a height of said first uncut-off portion is set in a range of 2 mm to 6 mm.

5. The processing method according to claim 3, wherein heights of said first and second uncut-off portions are set in a range of 2 mm to 6 mm.

* * * * *